United States Patent
Shan et al.

(10) Patent No.: US 9,342,408 B2
(45) Date of Patent: May 17, 2016

(54) BACKUP SYSTEM AND BACKCUP METHOD THEREOF

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Li-Ming Shan, Shenzhen (CN); Chih-San Chiang, New Taipei (TW); Hua-Dong Cheng, Shenzhen (CN); Wen-Xie Wei, Shenzhen (CN); Li-Feng Zhou, Shenzhen (CN); Min Yang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 309 days.

(21) Appl. No.: 13/972,929

(22) Filed: Aug. 22, 2013

(65) Prior Publication Data

US 2014/0164332 A1 Jun. 12, 2014

(30) Foreign Application Priority Data

Dec. 12, 2012 (CN) .......................... 2012 1 05337474

(51) Int. Cl.
*G06F 7/00* (2006.01)
*G06F 17/00* (2006.01)
*G06F 11/14* (2006.01)

(52) U.S. Cl.
CPC .................................. *G06F 11/1453* (2013.01)

(58) Field of Classification Search
CPC ............ G06F 11/1448; G06F 11/1453; G06F 11/1456
USPC ........................................................ 707/650
See application file for complete search history.

(56) References Cited

U.S. PATENT DOCUMENTS

| | | | |
|---|---|---|---|
| 2001/0034737 A1* | 10/2001 | Cane ................... | G06F 11/1451 |
| 2005/0228994 A1* | 10/2005 | Kasai .................. | G06F 21/6218 713/168 |
| 2005/0278493 A1* | 12/2005 | Lin ...................... | G06F 11/1458 711/162 |
| 2007/0006283 A1* | 1/2007 | Verbowski .......... | G06F 21/6218 726/2 |
| 2009/0228531 A1* | 9/2009 | Baumann ............ | G06F 11/1451 |

(Continued)

FOREIGN PATENT DOCUMENTS

| | | |
|---|---|---|
| CN | 101599079 A | 12/2009 |
| TW | 200534660 | 10/2005 |
| TW | 201227268 A1 | 7/2012 |

*Primary Examiner* — Binh V Ho
(74) *Attorney, Agent, or Firm* — Novak Druce Connolly Bove + Quigg LLP

(57) ABSTRACT

A backup method and a backup system are provided by the present disclosure. The method includes following steps: identifying the group the electronic device belongs when the backup device receives a backup request from an electronic device; receiving the data from the electronic device after identifying the group which the electronic device belong to; generating a unique mark to mark the received data; comparing a mark of the received data with the marks of the data already stored in the storage space assigned to the group which the electronic device belongs; determining whether the received data already exists in the storage space; storing the received data into the storage space assigned to the group which the electronic device belongs to only when the data from the electronic device does not exists in the storage space.

15 Claims, 3 Drawing Sheets

(56) References Cited

U.S. PATENT DOCUMENTS

| | | | |
|---|---|---|---|
| 2010/0114833 A1* | 5/2010 | Mu | G06F 11/1453 707/650 |
| 2011/0274070 A1* | 11/2011 | Xia | H04W 72/04 370/329 |
| 2012/0158670 A1* | 6/2012 | Sharma | G06F 3/0608 707/692 |
| 2013/0246366 A1* | 9/2013 | Preslan | G06F 11/1453 707/652 |
| 2013/0246460 A1* | 9/2013 | Maltbie | G06F 19/28 707/771 |

\* cited by examiner

BACKUP SYSTEM AND BACKCUP METHOD THEREOF

BACKGROUND

1. Technical Field

The present disclosure relates to a backup system and a backup method for backing up data.

2. Description of Related Art

A plurality of electronic devices such as computers, mobile phones can be connected to a server for storing and sharing data for users. The server receives and stores any file sent from the user, thus although a file received from the user already exists in the server, the server still backs up the file, which wastes a storage space of the server.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
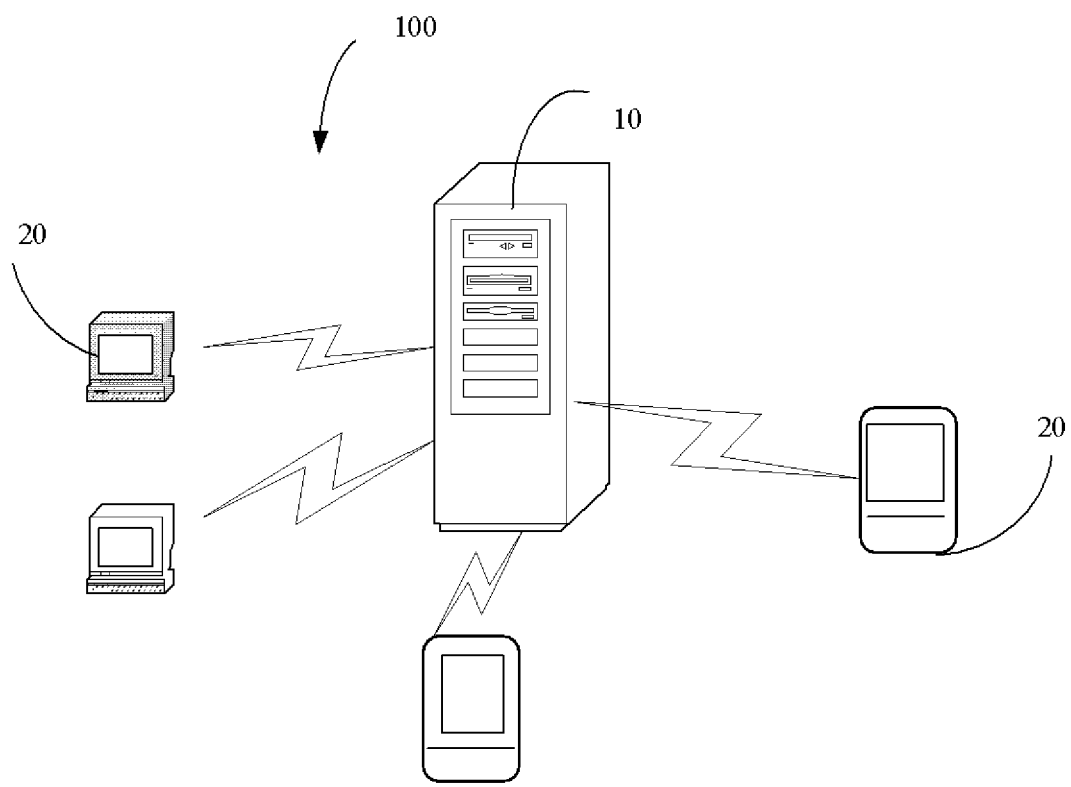
FIG. 1 is a schematic view of a backup system in accordance with an exemplary embodiment of the present disclosure.

FIG. 1 shows a backup system 100 in accordance with an exemplary embodiment of the present disclosure. The backup system 100 includes a backup device 10 and a plurality of electronic devices 20 communicating with the backup device 10. In the embodiment, the backup device 10 is a data storage server. The electronic device 20 sends a backup request and data needs to be backed up. The backup device 10 receives the backup request and the data and stores the data in response to the backup request.

Figure 2:
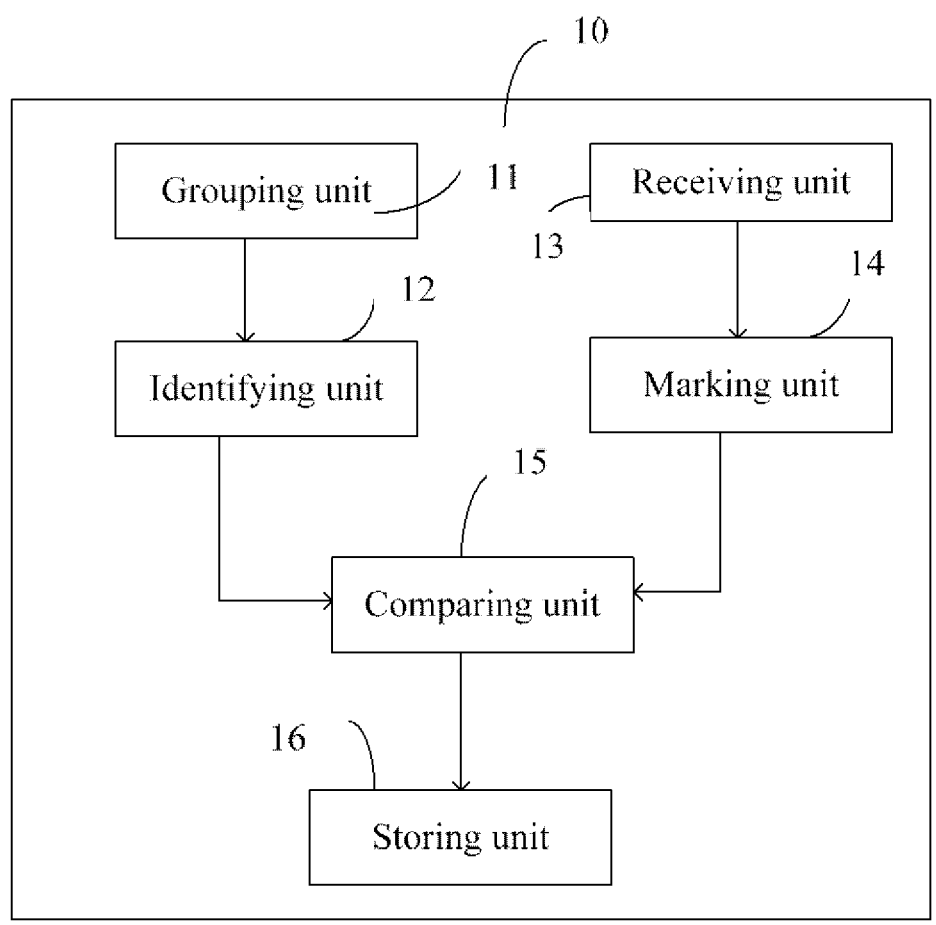
FIG. 2 is a block diagram of the backup device in FIG. 1.

FIG. 2 shows that the backup device 10 includes a grouping unit 11, an identification unit 12, a receiving unit 13, a marking unit 14, a comparing unit 15 and a storing unit 16.

The grouping unit 11 is configured for dividing the electronic devices 20 into different groups. In the embodiment, the electronic devices 20 are employed in a company. The grouping unit 11 divides the electronic devices 20 according to an organizational structure of users employing the electronic devices 20 in the company. In an alternative embodiment, the grouping unit 11 divides the electronic device 20 into groups according to the need of sharing data of users employing the electronic device 20 in the company. The grouping unit 11 is configured to assign an identification and a storage space to each group. The backup device 10 is configured to store a first relationship between electronic devices 20 and the groups which the electronic devices 20 belong to. For example, each electronic device 20 is also assigned with identification, the first relationship records correspondence between the identifications of electronic devices 20 and the identifications of the groups. The backup device 10 is further configured to store a second relationship between data to be backed up and electronic devices 20 sending the data to be backed up.

The identification unit 12 is configured for identifying the group which the electronic device 20 belongs to when the backup device 10 receives a backup request of backing up data from the electronic device 20. In the embodiment, the backup request includes an identification of the electronic device 20, an identification of the group that the electronic device 20 belongs to. The identification unit 12 identifies the group which the electronic device 20 belongs to in accordance to the identification included in the backup request.

The receiving unit 13 is configured for receiving the data from the electronic device 20 after the identification unit 12 identifies the group which the electronic device 20 belongs to. The data can be a file, a picture, a video, a piece of program code, for example. The data includes a head and content, the head records information of the data including name, size, creation time and type of the data. For example, the data type can be a word file, a TIF file, a PDF file or a txt file.

The marking unit 14 is configured for generating a unique mark to mark the data received by the receiving unit 13 and data already stored in the backup device 10, thus to identify the data from the other data. In the embodiment, the marking unit 14 calculates a Message-Digest Algorithm 5 (MD5) checksum value of the data to obtain the unique mark. The MD5 checksum value is a 32-character hexadecimal number that is computed on a file. Each file corresponds to a unique MD5. In the embodiment, the backup device 10 is further configured for storing the MD5 checksum value of the data.

The comparing unit 15 is configured for comparing the mark of the data from the electronic device 20 with the mark of the data stored under the group that the electronic device 20 belongs. In an embodiment, when the backup device 10 has already stored the marks of the data backed up in the storage space assigned to the group which the electronic device 20 belongs to, the comparing unit 15 accesses the marks of the backed up data from the backup device 10. In another embodiment, when the backup device 10 does not store the marks of the backed up data, the comparing unit 15 obtains the marks of the backed up data from the marking unit 14. In detail, the comparing unit 15 signals the marking unit 14 to generate the marks of the backed up data and feed back the marks of the backed up data to the comparing unit 15. In the embodiment, the comparing unit 15 compares the mark of data from the electronic device 20 with the marks of the data stored in the storage space assigned to the group the electronic device 20 belongs. The comparing unit 15 is further configured for determining whether the data from the electronic device 20 has already existed in the storage space assigned to the group which the electronic device 20 belongs to according to the comparison result. When the mark is same as one of the marks of the data stored in the storage space, the comparing unit 15 determines the data from the electronic device 20 has already been backed up and gives up to signal the storing unit 16 to back up the data from the electronic device 20. When the mark is different than the marks of the data stored in the storage space, the comparing unit 15 determines that the data from the electronic device 20 does not already exist in the storage space and signals the storing unit 16 to back up the data from the electronic device 20.

The storing unit 16 is connected to the comparing unit 15 and configured for storing the data received by the receiving unit 13, that is, the data from the electronic device 20 is backed up into the storage space of the group which the electronic device 20 belongs to. In an alternative embodiment, the storing unit 16 further stores the mark generated by the marking unit 14.

In another embodiment, the storing unit 16 is further configured for generating a storage path of the data from the electronic device 20 and sending the storage path to the electronic device 20. The electronic device 20 receives the storage path of the data and displays the storage path on a display screen of the electronic device 20. Therefore, user gets the storage path of the backup data from the display screen.

Figure 3:
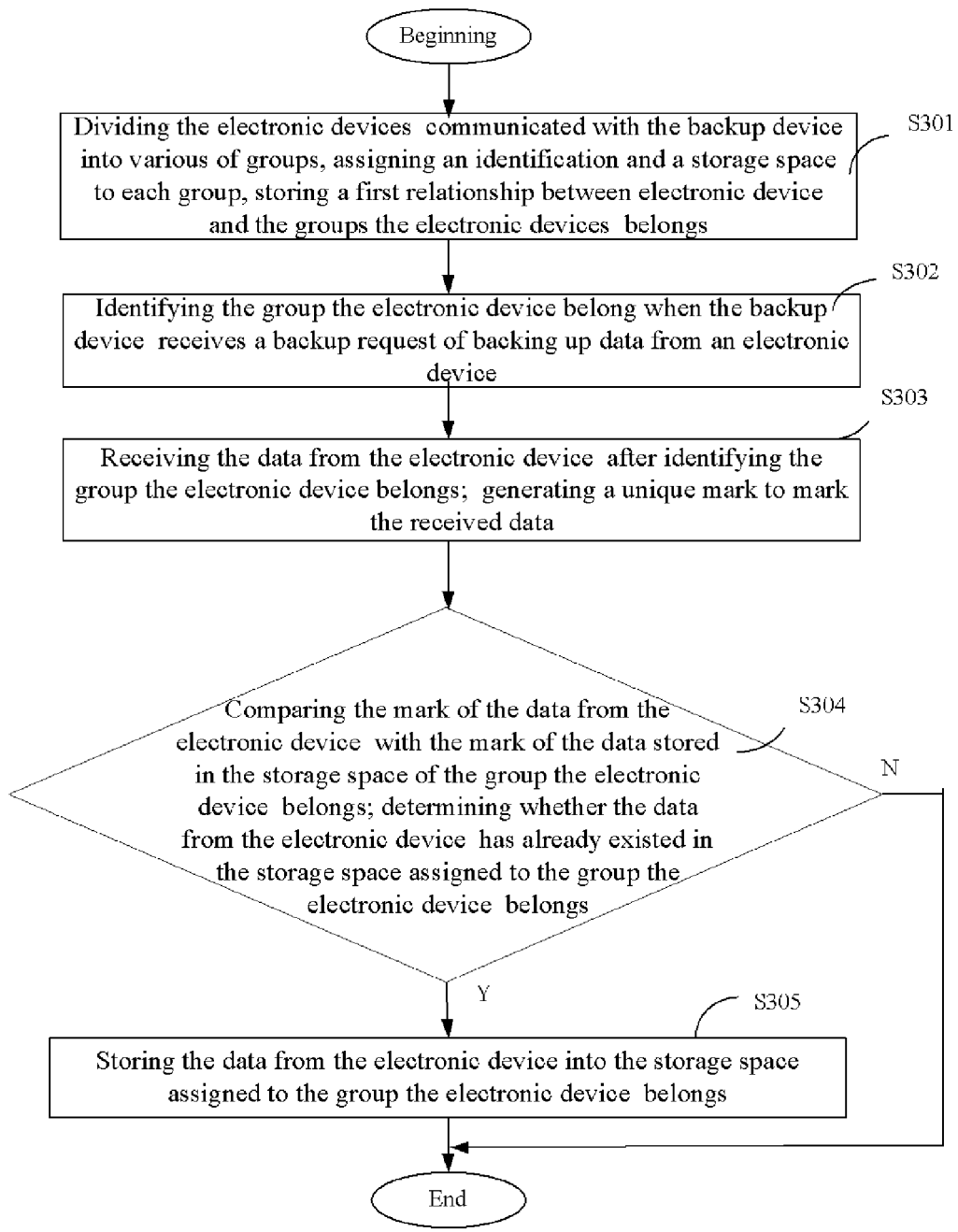
FIG. 3 is a flowchart of a backup method in accordance with an exemplary embodiment of the present disclosure.

FIG. 3 shows a flowchart of a backup method applied to the backup system 100. The backup system 100 includes the backup device 10 and the plurality of electronic devices 20 communicating with the backup device 10. The backup method includes following steps:

In step S301, the grouping unit 11 divides the electronic devices 20 communicating with the backup device 10 into various groups, the grouping unit 11 further assigns an identification and a storage space to each group, the backup device 10 stores a first relationship between electronic device 20 and the groups the electronic devices 20 belongs.

In step S302, the identification unit 12 identifies the group which the electronic device 20 belongs to when the backup device 10 receives a backup request of backing up data from an electronic device 20.

In the embodiment, the backup request includes an identification of the electronic device, an identification of the group that the electronic device belongs to or the like. The identification unit 12 identifies the group which the electronic device 20 belongs to in accordance to the identification included in the backup request of backing up data.

In step S303, the receiving unit 13 receives the data from the electronic device 20 after the identification unit 12 identifies the group which the electronic device 20 belongs to; the marking unit 14 generates a unique mark to mark the data received by the receiving unit 13.

In an alternative embodiment, the marking unit 14 further generates a unique mark to mark the data already stored in the backup device 10, thus to identify the data from the other data.

In the embodiment, the marking unit 14 calculates a MD5 checksum value of the data to obtain the unique mark of data from the electronic device 20 and the data already stored in the backup device 10.

In step S304, the comparing unit 15 compares the mark of the data from the electronic device 20 with the mark of the data stored in the storage space assigned to the group which the electronic device 20 belongs to. The comparing unit 15 determining whether the data from the electronic device 20 already exists in the storage space assigned to the group which the electronic device 20 belongs to, according to the comparison result; if yes, the process goes to end; if no, then the process goes to step S305.

In an embodiment, when the backup device 10 has already stored the marks of the data backed up in the storage space assigned to the group which the electronic device 20 belongs to, the comparing unit 15 accesses the mark of the backed up data from the backup device 10. In another embodiment, when the backup device 10 does not store the mark of the backed up data, the comparing unit 15 obtains the mark of the backed up data from the marking unit 14.

When the mark is same as one of the marks stored in the storage space assigned to the group which the electronic device 20 belongs to. The comparing unit 15 determines the data from the electronic device 20 has already been backed up; when the mark is different than the marks of the data stored in the storage space assigned to the group which the electronic device 20 belongs to, the comparing unit 15 determines the data from the electronic device 20 does not already exist in the storage space In the embodiment, the comparing unit 15 compares the MD5 checksum value of data from the electronic device 20 with the MD5 checksum values of data stored in the storage space of the group which the electronic device 20 belongs to. The comparing unit 15 determines whether the data from the electronic device 20 already exists in the storage space assigned to the group which the electronic device 20 belongs to according to the comparison result.

In step S305, the storing unit 16 stores the data from the electronic device 20 into the storage space assigned to the group which the electronic device 20 belongs to.

In an embodiment, the storing unit 16 further stores the mark generated by the marking unit 14. In an alternative embodiment, the storing unit 16 further generates a storage path of data from the electronic device 20 and sends the storage path to the electronic device 20. The electronic device 20 displays the storage path on a display screen of the electronic device 20.

Although the present disclosure has been described in considerable detail with reference to certain preferred embodiments herein, the disclosure is not for limiting the scope of the disclosure. Persons having ordinary skill in the art may make various modifications and changes without departing from the scope and spirit of the disclosure. Therefore, the scope of the appended claims should not be limited to the description of the preferred embodiments described above.

What is claimed is:

1. A backup system comprising:
a backup device;
a plurality of electronic devices communicating with the backup device to send backup request and data need to be backed up to the backup device, wherein the backup device stores a first relationship between electronic devices and groups which the electronic devices belong to and a second relationship between the data to be backed up and the electronic device sending the data to be backed up, the backup device assigns an identification and a storage space to each of the groups;
the backup device comprises:
an identification unit configured to identify the group which the electronic device belongs to when the backup device receives a backup request of backing up data from the electronic device;
a receiving unit configured to receive the data from the electronic device after the identification unit identifies the group which the electronic device belongs to;
a marking unit configured to generate a unique mark to mark the data received by the receiving unit;
a comparing unit configured to compare the mark of the data from the electronic device with the marks of the data stored under the group to which the electronic device belongs to determine whether the data from the electronic device has already existed in the storage space assigned to the group which the electronic device belongs to, and the comparing unit is configured to signal the marking unit to generates marks of the existed data and feed back the marks of the existed data to the comparing unit;
a storing unit is configured to store the data received by the receiving unit into the storage space of the group which the electronic device belongs to when the received data does not exist in the storage space assigned to the group which the electronic device belongs to.

2. The backup system as described in claim 1, wherein the marking unit is configured to calculate a Message-Digest Algorithm 5 (MD5) checksum value of the data received from the electronic device, the MD5 checksum value of the data is the unique mark of the data, the backup device stores MD5 checksum values of the data existed in the storage space assigned to the group which the electronic device belongs, the comparing unit is configured to compare the MD5 checksum value of data from the electronic device with each of the MD5 checksum values of the data existed in the storage space assigned to the group to which the electronic device belongs to determine whether the data from the electronic device already exists in the storage space assigned to the group which the electronic device belongs to.

3. The backup system as described in claim 2, wherein when the MD5 checksum value of data from the electronic device is same as one of MD5 checksum values of the data existed in the storage space assigned to the group the electronic device belongs, and the comparing unit determines the data from the electronic device already exists in the storage space assigned to the group which the electronic device belongs to.

4. The backup system as described in claim 2, when the MD5 checksum value of data from the electronic device is different than MD5 checksum values of the data existed in the storage space assigned to the group which the electronic device belongs to, and the comparing unit determines that the data from the electronic device does not exist in the storage space assigned to the group which the electronic device belongs to.

5. The backup system as described in claim 2, wherein the backup request sent by the electronic device includes an identification mark, the identification mark is an identification of the electronic device or an identification of the group which the electronic device belongs to, and the identification unit is configured for identifying the group which the electronic device belongs to in accordance with the identification mark and the first relationship.

6. The backup system as described in claim 2, wherein the backup device stores the marks of data already existed in storage space of the group which the electronic device belongs to; and the comparing unit is configured to obtain the marks of the data existed under the group to which the electronic device belongs from the backup device.

7. The backup system as described in claim 2, wherein the backup device does not store the marks of data already existed in storage space of the group which the electronic device belongs to; and the comparing unit is configured to signal the marking unit to generates marks of the existed data and feed back the marks of the existed data to the comparing unit.

8. The backup system as described in claim 2, wherein the backup system further includes a grouping unit, and the grouping unit is configured to divide the electronic devices into different groups and assign identification and a storage space to each group.

9. A backup method employing in a backup system, wherein the backup system includes a backup device and a plurality of electronic device communicating with the backup device to send backup request and data needs to be backed up to the backup device, the backup device storing a first relationship between electronic devices and the groups which the electronic devices belongs to and a second relationship between the data to be backed up and the electronic device sending the data to be backed up, the backup device assigns identification and a storage space to each of the groups;

identifying the group which the electronic device belongs to when the backup device receives a backup request from an electronic device;

receiving the data from the electronic device after identifying the group which the electronic device belongs to;

generating a unique mark to mark the received data;

comparing a mark of the data from the electronic device with marks of data already stored in the storage space assigned to the group which the electronic device belongs to, and generates marks of the existed data and feed back the marks of the existed data to the comparing unit;

determining whether the data from the electronic device already exists in the storage space; and storing the data from the electronic device into the storage space assigned to the group which the electronic device belongs to only when the data from the electronic device does not exist in the storage space assigned to the group which the electronic device belongs to.

10. The method described as in claim 9, wherein the unique mark is a Message-Digest Algorithm 5 (MD5) checksum value of the data.

11. The method described as in claim 10, wherein the step "generating a unique mark to mark the data" is to calculate the MD5 checksum value of the data; the step "comparing the mark of the data from the electronic device with the marks of the data stored in the storage space assigned to the group the electronic device belongs to" is to compare the MD5 checksum value of the data from the electronic device with the MD5 checksum values of data stored in storage space assigned to the group the electronic device belongs.

12. The method described as in claim 11, wherein when the MD5 checksum value of data from the electronic device is same as one of MD5 checksum values of the data existed in the storage space assigned to the group which the electronic device belongs to, it is determined that the data from the electronic device already exists in the storage space assigned to the group the electronic device belongs and give up the backup of the data into the storage space.

13. The method described as in claim 11, wherein when the MD5 checksum value of data from the electronic device is different than each of MD5 checksum values of the data existed in the storage space assigned to the group the electronic device belongs, it is determined that the data from the electronic device has not existed in the storage space assigned to the group which the electronic device belongs to and gone to the "storing" step.

14. The method described as in claim 9, wherein the backup request sent by the electronic devices includes an identification mark, the identification mark is an identification of the electronic device or an identification of group which the electronic device belongs to, and the step of "identifying the group of the electronic device" is done in accordance with the identification mark and the first relationship.

15. The method described as in claim 9, wherein before the step "identifying the group which the electronic device belongs to when the backup device receives a backup request from an electronic device", and the method further comprise:

dividing the electronic devices into different groups and assigning an identification and a storage space to each group.

* * * * *